United States Patent [19]
Hoffman et al.

[11] 3,827,535
[45] Aug. 6, 1974

[54] ELECTRICALLY OPERATED DISK BRAKE AND AUTOMATIC ADJUSTING MECHANISM

[75] Inventors: Neil R. Hoffman, Saukville; Johann H. Jansen, Milwaukee, both of Wis.

[73] Assignee: Kelsey-Hayes Company, Romulus, Mich.

[22] Filed: Sept. 11, 1972

[21] Appl. No.: 288,134

[52] U.S. Cl............. 188/138, 188/72.2, 188/206 R
[51] Int. Cl............................................. F16d 65/34
[58] Field of Search..... 188/72.2, 70 R, 138, 206 R, 188/71.8, 71.9, 196 BA

[56] References Cited
UNITED STATES PATENTS
| | | | |
|---|---|---|---|
| 2,649,941 | 8/1953 | Doebeli | 188/138 X |
| 3,422,933 | 1/1969 | Van House et al. | 188/72.2 |
| 3,677,375 | 8/1972 | Wolf | 188/138 |
| 3,708,040 | 1/1973 | Hollnagel | 188/72.2 |

Primary Examiner—Duane A. Reger
Attorney, Agent, or Firm—Harness, Dickey & Pierce

[57] ABSTRACT

An electrically operated disk type brake. The electric operator includes an electromagnet that is supported contiguous to the rotor and which, when actuated, moves axially into engagement with the rotor and rotates slightly with it. Means including tilting pin operators interconnect the electromagnet with the brake pads for actuating the brake pads in response to rotation of the electromagnet with the rotor. An improved automatic adjusting device is incorporated that is responsive to circumferential movements of the brake pads for adjusting the at rest position of the pads. Substantially all of the brake parts are formed from sheet metal and the electromagnet is press fit into its supporting member to reduce cost of the overall assembly.

11 Claims, 9 Drawing Figures

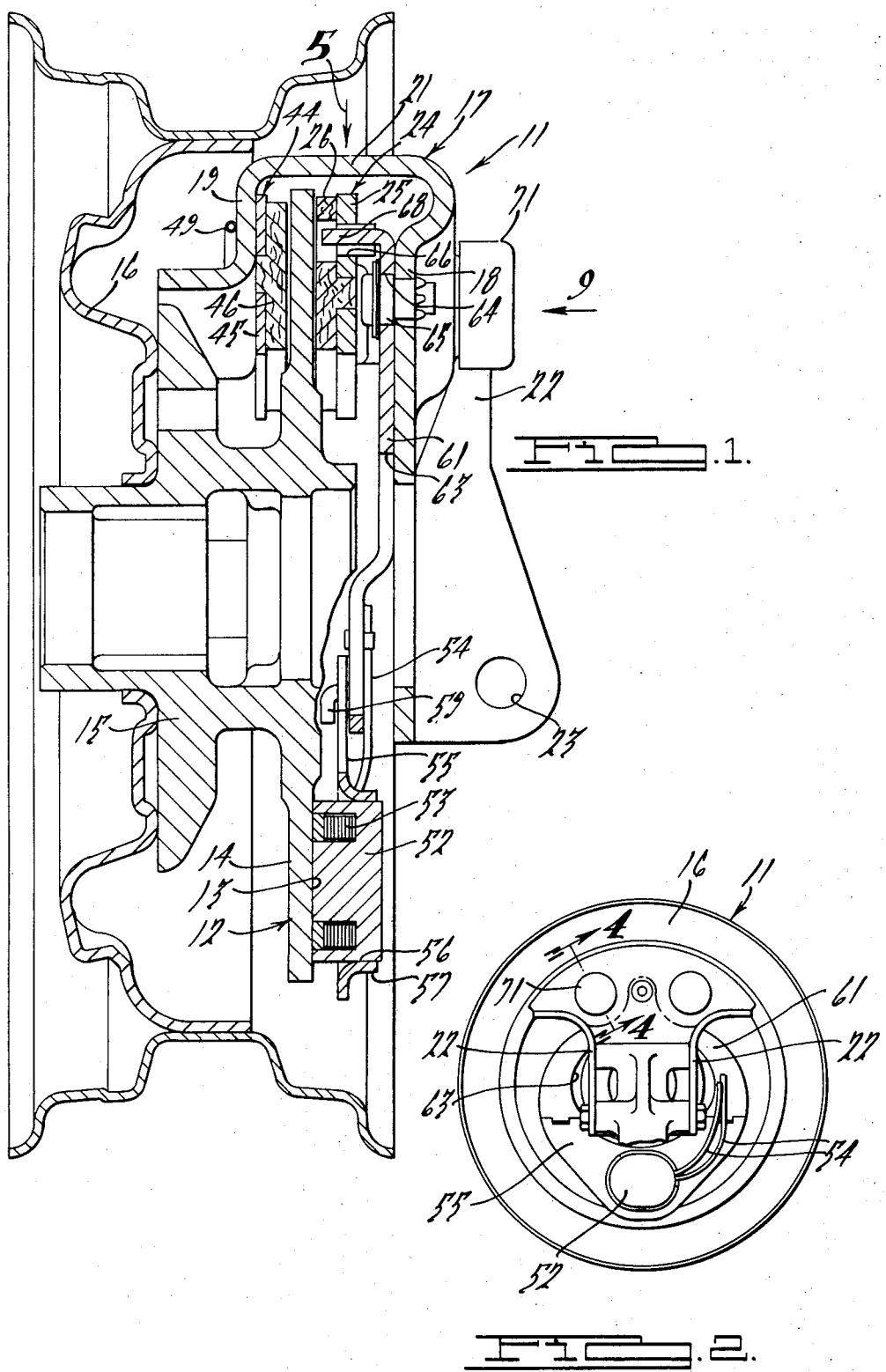

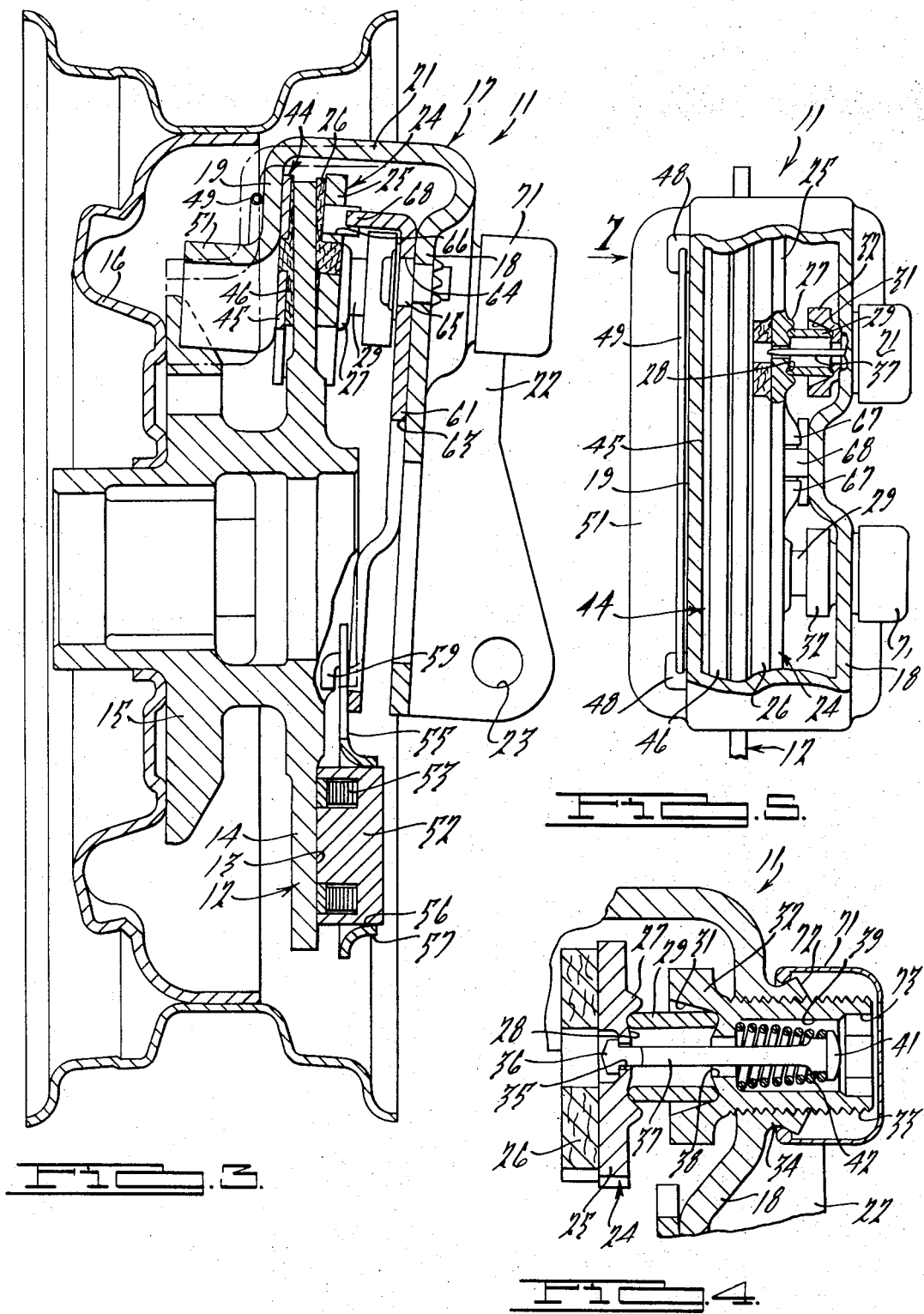

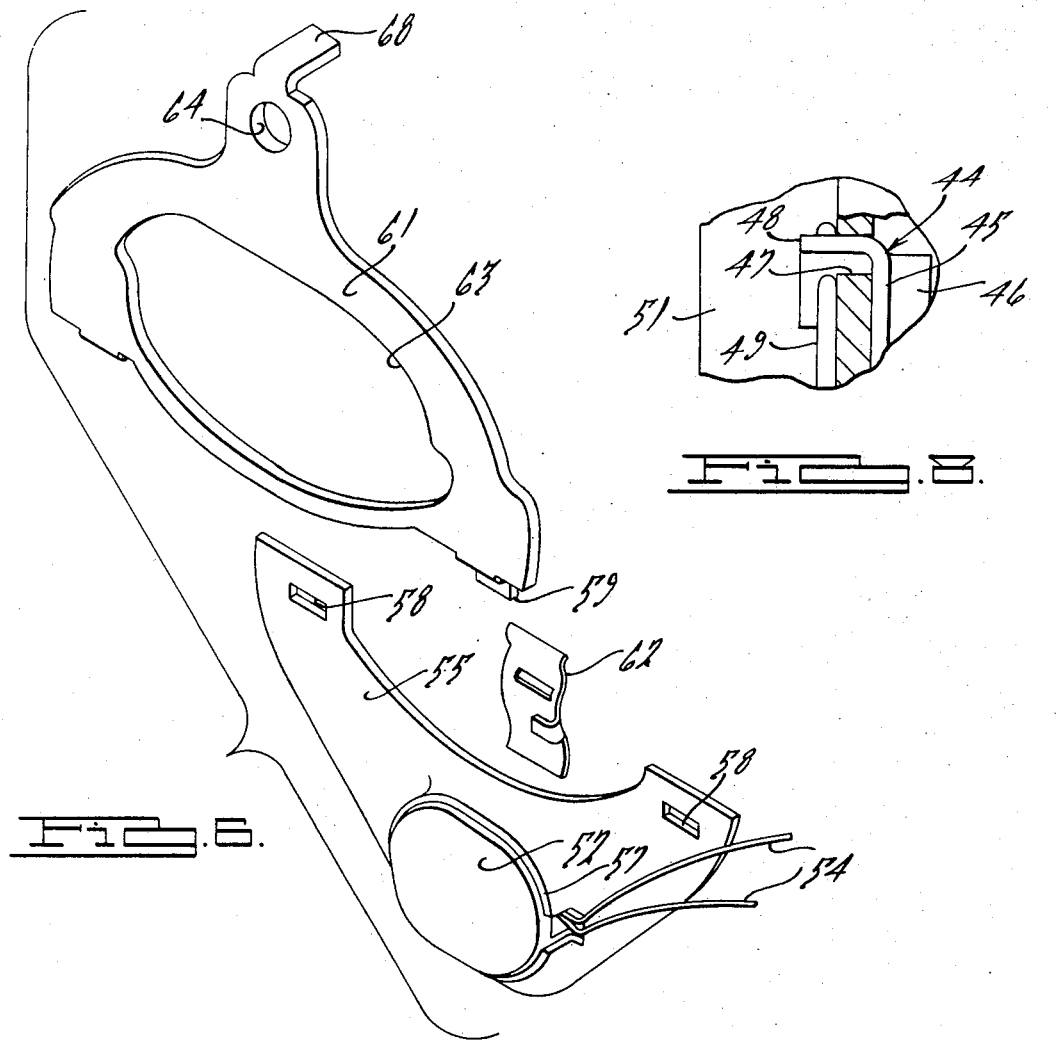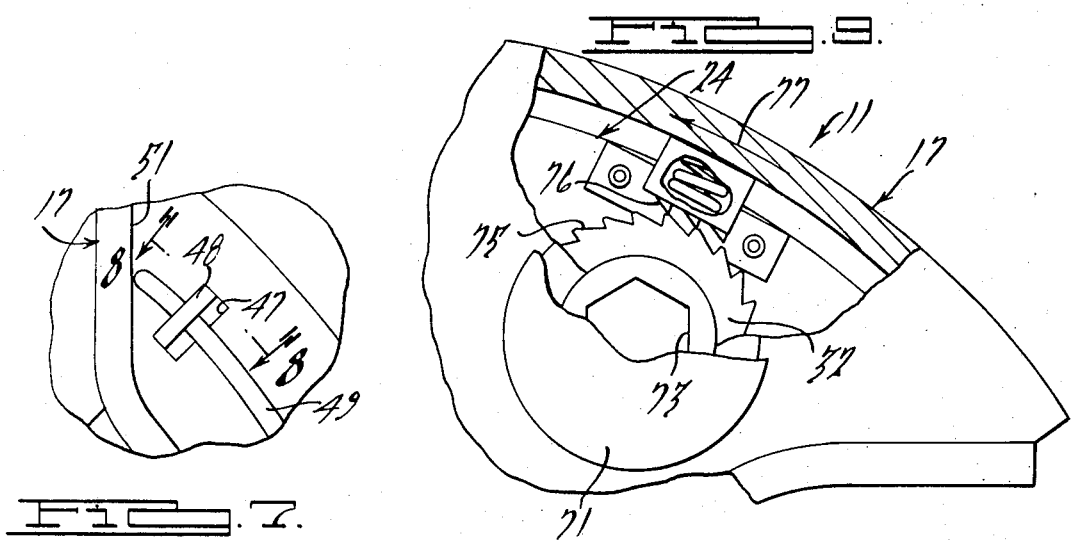

3,827,535

ELECTRICALLY OPERATED DISK BRAKE AND AUTOMATIC ADJUSTING MECHANISM

BACKGROUND OF THE INVENTION

This invention relates to a disk brake assembly and more particularly to an improved, electrically operated disk brake, an actuating electromagnet assembly thereof, and an automatic adjuster.

In one type of electrically operated disk brake the actuating mechanism for the brake includes an electromagnet and a supporting assembly that interconnects the magnet with the brake pads for their actuation. In order to reduce the cost of the assembly it is an object of this invention to provide an improved and simplified arrangement for connecting the electromagnet to its supporting member.

In brake assemblies various arrangements have been proposed for adjusting the at rest position of the brake shoes to compensate for wear of the frictional linings. Such arrangements have been proposed for both drum and disk type brakes. In most of the previously proposed automatic adjusters for disk type brakes, adjustment has been provided in response to a predetermined degree of axial movement of the brake pad. This has necessitated, in most instances, interpositioning of the automatic adjuster between the actuating device and the brake pad. With such an arrangement, the automatic adjusting mechanism frequently is required to transmit all of the braking loads. This type of arrangement adds to the cost of the assembly.

It is, therefore, a further object of this invention to provide an improved automatic adjusting mechanism for a disk brake assembly.

It is another object of this invention to provide an automatic adjuster, for a disk brake that is responsive to circumferential rather than axial movement of the brake pad.

SUMMARY OF THE INVENTION

A first feature of the invention is adapted to be embodied in an electromagnetic assembly for an electrically operated brake or the like of the type described in the preceding paragraph. A formed sheet metal support arm is adapted to be juxtaposed to an annular braking surface of a disk brake rotor or the like. An opening is formed in the support arm and is defined by a flange that is turned in a direction that extends substantially perpendicularly to the associated rotor braking surface. An electromagnet has a cross sectional periphery complementary to the opening in the support arm and press fit there into.

Another feature of this invention is adapted to be embodied in a disk brake assembly for braking the rotation of an associated rotor. A brake pad is juxtaposed to a braking surface of the rotor and actuating means are provided for forcing the brake pad into engagement with the rotor braking surface. Stop means determine the at rest position of the brake pad. The brake pad is supported for movement in the direction of rotation of the rotor upon engagement with the rotor braking surface. The degree of such rotation is related to the degree of axial movement of the brake pad from its at rest position to its engaged position. Automatic adjusting means are responsive to a predetermined degree of rotating movement of the brake pad for adjusting the stop means and the at rest position of the brake pad to compensate for wear.

BRIEF DESCRIPTION OF THE DRAWINGS

FIG. 1 is a cross sectional view of a disk brake assembly embodying this invention and an associated vehicular wheel taken through the axis of rotation.

FIG. 2 is a side elevational view, on a reduced scale, of the wheel and brake assembly shown in FIG. 1.

FIG. 3 is a cross sectional view, in part similar to FIG. 1, showing the brake components after the brake pad linings have undergone considerable wear.

FIG. 4 is an enlarged cross sectional view, on substantially the same scale as FIGS. 1 and 3, taken along the line 4—4 of FIG. 2.

FIG. 5 is a top view of the brake assembly, taken generally in the direction of the arrow 5 in FIG. 1, with portions broken away to more clearly show the construction.

FIG. 6 is an exploded perspective view of the electromagnetic brake actuating mechanism.

FIG. 7 is a view taken generally in the direction of the arrow 7 in FIG. 5.

FIG. 8 is a cross sectional view taken along the line 8—8 of FIG. 7.

FIG. 9 is an enlarged view, with portions broken away, of the automatic adjusting mechanism of the brake and is taken generally in the direction of the arrow 9 in FIG. 1.

DETAILED DESCRIPTION OF THE PREFERRED EMBODIMENT

A disk brake assembly embodying this invention is identified generally by the reference numeral 11. The brake assembly 11 is adapted to brake the rotation of an associated rotor 12 having oppositely disposed, annular braking surfaces 13 and 14. The rotor 12 has an integral hub 15 that receives bearings (not shown) for rotatably supporting the rotor 12 in a known manner. A vehicular wheel 16 is affixed for rotation with the rotor 12 in any known manner.

The brake assembly 11 is formed from a plurality of pieces, primarily sheet metal stampings. These pieces include a caliper, indicated generally by the reference numeral 17, that has leg portions 18 and 19 that are disposed adjacent the rotor braking surfaces 13 and 14, respectively. The leg portions 18 and 19 are integrally connected by a web portion 21 that extends across the outer periphery of the rotor 12 at the radial outer terminations of the leg portions 18 and 19.

The leg portion 19 is reinforced and supported by integral rearwardly extending flanges 22 that are formed at its opposite sides. The flanges 22 are apertured, as at 23 to pass a pivot pin (not shown) that is fixed to any convenient portion of the associated vehicle for pivotally supporting the caliper 17.

A first brake pad, indicated generally by the reference numeral 24 is interposed between the caliper leg 18 and the rotor braking surface 13. The brake pad 24 includes a sheet metal backing plate 25 to which is affixed a frictional lining material 26 in any known manner such as by bonding, riveting or the like. The backing plate 25 has a pair of circumferentially spaced annular projections 27 (FIGS. 1 and 5). The projections 27 define pockets 28 that receive one end of a hollow tilting pin or tube 29. The other end of the tilting pin 29 is received in a pocket 31 formed by an adjusting member 32 which pocket 31 forms a stop means for determining the at rest position of the brake pad 24. The adjusting member 32 has male threads 33 that are threaded into a female threaded opening 34 formed in the caliper leg 18 to provide an adjustment for the at rest position of the brake assembly, as will become more apparent.

Adjacent each of the projections 27 the backing plate 25 is formed with a generally flattened aperture 35 through which the flattened T-shaped head 36 of a return pin 37 extends. The return pin 37 extends through the hollow tilting pin 29 and through a somewhat diameter opening 38 formed in the adjusting member 32. Adjacent the opening 38, the adjusting member 32 is formed with a larger diameter opening 39 into which a head 41 of the return pin 37 extends. A coil spring 42 encircles the portion of the pin 37 contained within the bore 39 and bears against the head 41 for urging the brake pad 24 in a retracted direction, as will become apparent.

A second brake shoe, indicated generally by the reference numeral 44 is interposed between the caliper leg 19 and the rotor braking surface 14. The second brake shoe 44 includes a backing plate 45 formed from sheet metal and a frictional lining 46. The lining 46 is affixed to the backing plate 45 in any suitable manner, as by bonding, riveting or the like. The brake shoe 44 is affixed relative to the caliper leg 19. To accomplish this, the caliper leg 19 is formed with a pair of circumferentially spaced apertures 47 (FIGS. 7 and 8) through which rearwardly extending flanges 48 formed at the opposite ends of the backing plate 45 extend. The flanges 48 are apertured at a position that lies adjacent the outer periphery of the caliper leg 19 and receive a single spring clip 49. The ends of the spring clip 49 are juxtaposed to an offset flange 51 of the caliper leg 19 so as to prevent accidental disassembly. This arrangement holds the brake pad 44 axially and circumferentially relative to the caliper leg 19. Convenient replacement is, however, permitted.

The brake assembly is actuated electrically by means including an electromagnet 52 that is juxtaposed to the rotor braking surface 13 diametrically opposite to the brake pad 24. The electromagnet 52 includes a ferromagnetic core and a winding 53. Terminals 54 (FIG. 6) extend from the winding 53 for energization in any suitable manner.

The electromagnet 52 coacts with the rotor 12, which is also formed from a ferromagnetic material, and is supported for both axial and circumferential movement relative to the rotor 12. This supporting arrangement includes a first sheet metal lever 55 having a generally bifurcated configuration. An aperture 56 is formed in the lever 55 and is defined by an outwardly bent flange 57 that extends parallel to the axis of rotation of the rotor 12 and in a direction away from the rotor braking surface 13. The electromagnet 52 has a complementary shape to the aperture 56 and is press fit into the aperture from the face opposite to the flange 57. As a result of this press fitting, the electromagnet 52 is rigidly retained within the sheet metal lever 55 and cannot become disassembled from it.

The bifurcated arms of the lever 55 are formed with slotted openings 58. The openings 58 receive offset tabs 59 of a second sheet metal supporting lever 61. Specially formed spring clips 62 hold the lever 55 assembled to the lever 61. These spring clips, however, permit the levers 55 and 61 to pivot slightly relative to each other, for a reason which will become more apparent as this description proceeds.

The lever 61 is formed with an opening 63 that passes the axle or spindle (not shown) of the associated vehicle. A smaller diameter opening 64 is positioned adjacent the brake pad 24 and receives a pivot pin 65 that is staked or otherwise secured to the caliper leg 18. The pivot pin 65 pivotally journals the levers 61 and 55 for rotation about a pivot axis defined by a pin 65 and apertures 64.

An aperture 66 is formed in the backing plate 25 of the brake pad 24 by a pair of outwardly extending embossments 67 (FIG. 5). An inwardly turned tang 68 of the lever 61 extends into the aperture 66 between the embossments 67.

The operation of the brake assembly may best be understood by reference to FIGS. 1, 4 and 5. These Figures illustrate the brake in a released or at rest position and before frictional linings 26 and 46 have become worn. When it is desired to actuate the brake assembly 11, the electromagnet 52 is energized to generate a magnetic field. The magnet 52 will then be drawn axially toward the rotor braking surface 13 and will, in fact, come into engagement with this surface. This axial movement is permitted by the connection between the lever 55 and the lever 61.

Upon engagement of the electromagnet 52 with the rotor braking surface 13, a frictional force will be developed which causes the electromagnet 52 to rotate in the direction of rotation of the rotor 12. This rotation causes the levers 55 and 61 to pivot about the pivot pin 65. This causes the tang 68 to traverse the aperture 66 and engage one or the other of the embossments 67. The brake shoe 24 will then be moved circumferentially in the direction of rotor rotation. When this occurs, the tilting pins 29 will pivot and exert an axial force on the brake pad 24. Simultaneously, a reactive force in the opposite direction will be exerted on the brake pad 44 through the caliper leg 19. Because the pins 29 assume an angular disposition the axial force acting on the brake pads will have a self-energizing effect.

When the brake pads 24 and 44 move into engagement with the rotor braking surfaces 13 and 14 the return pins 37 will compress the return springs 42. When the brakes are released, the return springs 42 will act through the pins 37 to provide a retractile force.

It has been noted that the caliper 19 is pivotally supported. Actual movement of the brake pads 24 and 44 into engagement with the rotor braking surfaces 13 and 14 is also pivotal. The pivotal movement, however, has a substantially axial component. As a result of this pivotal movement, however, the caliper 17 and associated components will assume a different angular position in the at rest position as the frictional linings 26 and 46 become worn. FIG. 3 shows the components in the position they assume at maximum lining wear. This difference in angle may be readily appreciated by a comparison of FIGS. 1 and 3. The electromagnet 52 should not, however, be forced to follow the pivotal movement of the caliper 17 or it will constantly rub against the rotor braking surface 14 when the degree of wear of the linings 24 and 46 reaches that shown in FIG. 3. The connection between the levers 61 and 55, aforedescribed, permits these levers to pivot relative to each other so that the lever 55 always maintains the same angular relationship to the rotor braking surface 13.

As has been noted, the adjusting members 32 may be positioned relative to the caliper 17 so as to compensate for wear of the frictional linings 26 and 46. This may be accomplished manually, by removing dust shields in the form of flexible boots 71 from flanges 72 that encircle the threaded portion 34 of the caliper leg 18. A suitable tool may then be inserted into a socket shaped opening 73 formed in each of the adjusting members 32 for rotating the adjusting member and accomplishing the adjustment.

An arrangement is provided, however, for accomplishing automatic adjustment. This mechanism is best shown in FIG. 9. The adjusting member 32 is formed with serrated ratchet teeth 75 on its outer periphery and in the area immediately adjacent the brake pad backing plate 25. A spring biased ratchet pawl 76 is carried by the backing plate 25 adjacent each of the adjusting members 32. The ratchet pawl 76 has teeth that coact with the serrated teeth 75 of the adjusting member. It will be remembered that the brake pad 24 moves circumferentially with the rotor 12 upon initial brake engagement. The normal direction of rotor rotation and brake pad movement is indicated by the arrow 77 in FIG. 9. The degree of this movement like the degree of axial movement of the brake pad 24 is dependent upon the degree of lining wear. When sufficient wear has been experienced, the teeth of the ratchet pawl 76 will engage the next successive serrated teeth 75 of the adjusting member 72. This occurs when the wear slightly exceeds that shown in FIG. 9. Upon the release of the brakes the brake shoe 24 will move in a direction opposite to the arrow 77 under the influence of the return springs 42. Upon this return movement, the adjusting member 32, will be rotated and its threads will cause axial movement of the adjusting member 32, the tilting pin 29 and the brake pad 24.

It is to be understood that the foregoing description is that of a preferred embodiment of the invention. Various changes and modifications may be made without departing from the spirit and scope of the invention as defined by the appended claims.

We claim:

1. An electrically operated disk brake assembly for braking the rotation of an associated rotor having an annular brking surface disposed generally in a plane perpendicular to its axis of rotation, an electromagnetic element juxtaposed to said rotor, means for supporting said electromagnetic element for movement relative to the rotor in a direction having at least a component that extends parallel to the axis of rotation of the rotor and for at least limited rotation about said axis, actuating means for selectively generating an electromagnetic force for moving said electromagnetic element and the rotor axially relative to each other for limited rotation of said electromagnetic element with the rotor, a brake pad, means for supporting said brake pad for movement in a direction having an axial component into engagement with the rotor braking surfaces and for limited rotary movement about the axis of the associated rotor, means for translating rotary movement of said electromagnetic element into movement of said brake pad into engagement with the rotor braking surface, and automatic adjusting means responsive to the degree of rotary movement of said brake pad for automatically adjusting the at rest position of said brake pad in response to a predetermined rotation thereof.

2. An electrically operated disk brake assembly as set forth in claim 1 wherein the means for automatically adjusting the at rest position of the brake pad includes an adjusting member having a threaded connection to a supporting member, said adjusting member being formed with serrated teeth, and a spring biased pawl carried by said brake pad and engageable with said serrated teeth for rotating said adjusting member in response to the predetermined degree of rotary movement of said brake pad.

3. An electromagnetic assembly for an electrically actuated brake or the like comprising a first formed sheet metal support lever adapted to be juxtaposed to an annular braking surface of a disk brake rotor or the like, an opening formed in said first support lever and defined by a flange that is turned in a direction that extends substantially perpendicularly to the associated rotor braking surface, an electromagnet having a cross sectional periphery complementary to said opening, said electromagnet being press fit into said opening and retained therein by said flange, a second formed sheet metal support lever, and means operatively connecting said levers together for simultaneous pivotal movement about an axis that extends parallel to the rotor axis and for relative pivotal movement about an axis transverse to said pivot axis.

4. An electromagnetic assembly as set forth in claim 3 wherein the flange extends axially away from the associated rotor braking surface.

5. An electromagnetic assembly as set forth in claim 2 wherein the means for providing the operative connection between the levers includes outstanding tangs formed on one of the levers and received in complementary openings on the other of said levers, and spring clips for retaining said tangs within said openings and for permitting pivotal movement of said tangs within said openings.

6. A disk brake assembly for braking the rotation of an associated rotor comprising a brake pad juxtaposed to a braking surface of the rotor and supported for axial movement relative to the braking surface, actuating means for forcing said brake pad axially into engagement with the rotor braking surface, stop means for determining the at rest position of said brake pad, said brake pad being supported for movement in the direction of rotation of the rotor upon engagement with its braking surface, the degree of such brake pad rotation being related to the degree of axial movement of said brake pad from its at rest position to its engaged position, an automatic adjusting means responsive to a predetermined degree of rotary movement of said brake pad for automatically adjusting said stop means and the at rest position of said brake pad to compensate for wear.

7. A disk brake assembly as set forth in claim 6 wherein the automatic adjusting means includes means carried by the brake pad and cooperating means carried by the stop means for adjusting the stop means in response to the brake pad rotation.

8. A disk brake assembly as set forth in claim 7 wherein the stop means has a threaded connection with a supporting member and the automatic adjusting means includes means for turning said threaded connection.

9. A disk brake assembly as set forth in claim 8 wherein the stop means is formed with serrated teeth and the means carried by the brake pad includes a spring biased pawl cooperating with said serrated teeth for rotating said stop means.

10. A disk brake assembly as set forth in claim 8 further including a tilting pin interposed between the stop means and the brake pad, the means for actuating said brake pad comprising means for pivoting said tilting pin.

11. A disk brake assembly as set forth in claim 10 wherein the stop means is formed with serrated teeth and the means carried by the brake pad includes a spring biased pawl cooperating with said serrated teeth for rotating said stop means.

* * * * *